Patented Dec. 16, 1924.

1,519,149

UNITED STATES PATENT OFFICE.

FRANCIS PATRIDGE McCOLL, OF RIDGEWOOD, NEW JERSEY, AND WALTER WILLIAM WILLISON, OF BROOKLYN, NEW YORK, ASSIGNORS, BY MESNE ASSIGNMENTS, TO THERMOKEPT CORPORATION, A CORPORATION OF DELAWARE.

METHOD OF PREVENTING THE FORMATION OF WHITE DEPOSITS ON COMMODITIES CANNED IN VACUO.

No Drawing. Application filed May 13, 1922. Serial No. 560,712.

*To all whom it may concern:*

Be it known that we, FRANCIS P. McCOLL, a citizen of Canada, residing at Ridgewood, in the county of Bergen, State of New Jersey, and WALTER W. WILLISON, a citizen of the United States, residing at Brooklyn, in the county of Kings and State of New York, have made a certain new and useful Invention or Discovery in a Method of Preventing the Formation of White Deposits on Commodities Canned in Vacuo, of which the following is a specification.

It has heretofore been proposed to can commodities in vacuo to thereby keep said commodities in their original state of preservation or fitness for use. The utility of this method has been greatly curtailed, however, by the fact that certain goods, if thus canned, soon develop a whitish deposit, which militates against their sale or use.

The nature of said deposits is not fully understood. We believe, however, that said deposits vary in accordance with the goods canned, and the composition of the commodities or goods themselves, and that generally these deposits are harmless. As typical examples, without, however, limiting ourselves, we may cite the observations on such widely different commodities as chocolates, cigars and rubber goods. In the two commodities first named, a white deposit forms probably in the nature of a precipitated fat and a salt, while in the latter a distinctive "bloom" appears. On other commodities still other characteristics appear. In no case, however, is it believed that said deposits are molds or cryptogamous in nature.

We have discovered that all these undesirable markings or deposits may be effectually prevented by causing the vacuumized space, which surrounds the goods thus canned, to be supplied with, or saturated by, an aqueous vapor, which has been deprived of all free or occluded oxygen. It is, therefore, the prime object of our invention to create, within a vacuumized vessel containing goods, a condition which will positively and effectively counteract or prevent the formation of said undesirable deposits or blooms.

As an example of carrying out our invention, without, however, limiting ourselves to the specific mode of procedure recited herewith, we provide the vacuumized goods with an aqueous vapor or a source from which such vapor is derived, which vapor is entirely deprived of all free or occluded oxygen. This may be accomplished in various ways, depending upon the nature of the goods to be canned. Where readily water-soluble and goods easily affected by moisture are to be subjected to our preventive method, we find a most efficient way to provide the requisite amount of moisture to be obtained, by saturating disks of cork in vacuumized water, or the disks may be first saturated and then vacuumized. One or more of these cork pads are then placed in the container with the goods, and preferably at the bottom of the container. The goods, as candies, chocolates, or cigars, and the like, are then placed in the container, and the whole collection and container are then subjected to a vacuum and sealed while in said vacuum. Where non-soluble goods are to be preserved, as rubber, leather, and the like, the cork method above enumerated is not required, but a specified quantity of vacuumized water, sufficient to saturate the vacuumized space, is placed in the vessel with the goods, and the whole vacuumized and sealed as above. By use of our method we find that no white deposit or bloom will deposit on goods thus sealed, and the goods can be kept in their original and bright appearing state for a very long period of time. The many advantages, as well as the facility with which our method may be carried out, will readily recommend themselves to those versed in the art.

While we have disclosed a specific embodiment of our invention, and have given examples thereof, we do not thereby desire to be understood as having thus limited ourselves unduly.

What we claim, therefore, as new and useful, of our own invention, and desire to secure by Letters Patent, is:

1. The method of preventing the formation of white deposits on goods canned in a vacuum, which comprises canning said goods in vacuo together with a vacuumized liquid for a source of aqueous vapor to thereby prevent said deposits.

2. The method of preventing the formation of white deposits on goods canned in a vacuum, which comprises providing a porous body carrying vacuumized water for a source of aqueous vapor and sealing said body and water with the goods in vacuo.

3. The method of preventing the formation of white deposits on goods canned in a vacuum, which comprises introducing into said can with the goods to be canned, a vacuumized body of water and sealing the goods and body of water in vacuo.

4. The method of preventing the formation of white deposits on goods canned in a vacuum, which comprises introducing into said can with the goods to be canned, a porous body containing vacuumized water, and sealing said goods and body in vacuo.

5. The method of preventing the formation of white deposits on goods canned in a vacuum, which comprises canning in vacuo with said goods a body carrying a vacuumized liquid to provide aqueous vapor when said goods are vacuumized and sealed.

6. The method of preventing the formation of a white deposit or bloom on goods canned in a vacuum, which comprises providing a body containing vacuumized water, introducing said body into the vessel with the goods to be canned, and vacuumizing and sealing said body and goods in vacuo.

7. The method of preventing the formation of a white deposit or bloom on goods canned in a vacuum, which comprises providing a body of vacuumized water in a vessel containing goods to be vacuumized and sealed, then vacuumizing said vessel and sealing the same while vacuumized.

8. The method of preventing the formation of a white deposit or bloom on goods canned in a vacuum, which comprises providing within said can a source of aqueous vapor, which vapor has previously been deprived of free and occluded oxygen.

In testimony whereof we have hereunto set our hands on this 8th day of May A. D., 1922.

FRANCIS PATRIDGE McCOLL.
WALTER WILLIAM WILLISON.